United States Patent
Suzuki et al.

(10) Patent No.: US 11,685,432 B2
(45) Date of Patent: Jun. 27, 2023

(54) ROTATION DETECTOR AND STEERING SYSTEM

(71) Applicant: DENSO CORPORATION, Kariya (JP)

(72) Inventors: Haruo Suzuki, Kariya (JP); Nobuyori Nakajima, Kariya (JP); Koichi Nakamura, Kariya (JP); Go Endoh, Kariya (JP); Atsuko Oka, Kariya (JP); Takashi Suzuki, Kariya (JP); Yosuke Ogi, Kariya (JP); Shuji Kuramitsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 569 days.

(21) Appl. No.: 16/597,145

(22) Filed: Oct. 9, 2019

(65) Prior Publication Data

US 2020/0114961 A1 Apr. 16, 2020

(30) Foreign Application Priority Data

Oct. 11, 2018 (JP) .............................. JP2018-192696

(51) Int. Cl.
B62D 6/00 (2006.01)
B60Q 9/00 (2006.01)
B62D 5/04 (2006.01)
B62D 15/02 (2006.01)

(52) U.S. Cl.
CPC .............. B62D 6/008 (2013.01); B60Q 9/00 (2013.01); B62D 5/0481 (2013.01); B62D 15/021 (2013.01)

(58) Field of Classification Search
CPC .... B62D 6/008; B62D 5/0481; B62D 15/021; B60Q 9/00
See application file for complete search history.

(56) References Cited

U.S. PATENT DOCUMENTS

| | | | | |
|---|---|---|---|---|
| 2004/0222033 | A1* | 11/2004 | Kameya | B62D 5/008 180/404 |
| 2008/0040001 | A1* | 2/2008 | Ogawa | B62D 5/0487 310/68 B |
| 2010/0094507 | A1* | 4/2010 | Mitsuhara | B62D 15/0215 701/42 |
| 2015/0239501 | A1* | 8/2015 | Fujita | B62D 15/021 701/41 |
| 2016/0131508 | A1 | 5/2016 | Nagata et al. | |
| 2020/0114967 | A1* | 4/2020 | Nakajima | B62D 5/049 |

FOREIGN PATENT DOCUMENTS

JP 5958572 B2 8/2016
WO 2014174614 A1 10/2014

OTHER PUBLICATIONS

U.S. Appl. No. 16/597,176, filed Oct. 9, 2019, Oct. 9, 2019, Nobuyori Nakajima, et al.

* cited by examiner

Primary Examiner — Ig T An
(74) Attorney, Agent, or Firm — Maschoff Brennan

(57) ABSTRACT

A rotation detector has a first controller that monitors abnormality of a rotation number calculated by a rotation number calculator based on the calculated rotation number and a preset rotation angle. The first controller in a first system is configured to output rotation information calculated by a second controller in a second system upon having determination that the rotation number of the first system has abnormality, for a continuation of the rotation information calculation.

13 Claims, 12 Drawing Sheets

ROTATION DETECTOR AND STEERING SYSTEM

CROSS REFERENCE TO RELATED APPLICATION

The present application is based on and claims the benefit of priority of Japanese Patent Application No. 2018-192696, filed on Oct. 11, 2018, the disclosure of which is incorporated herein by reference.

TECHNICAL FIELD

The present disclosure generally relates to a rotation detection device that outputs a detection value corresponding to the rotation of a detection target, and a steering system including the rotation detection device.

BACKGROUND INFORMATION

In the related art, a rotation detection device exists that detects rotation of a detection target and calculates rotation information associated with the rotation of the detection target based on a detection value from a sensor or the like. For example, a rotation detection device that detects a rotation angle and the number of rotations of a motor, which is a detection target. The related art rotation detection device compares the number of rotations of the motor with the rotation angle to determine whether or not there is an abnormality in the number of rotations.

If the number of rotations detected by the rotation detection device is abnormal, there is a possibility that the rotation information cannot be properly calculated based on such abnormal number of rotations. Therefore, it is conceivable to forcibly stop the calculation of the rotation information when an abnormality occurs in the number of rotations. However, stopping the calculation of the rotation information may lead to a stop of the control of a drive target by using the rotation information.

SUMMARY

It is an object of the present disclosure to provide a rotation detection device that is capable of continuing calculation of the rotation information while preventing the influence of an abnormality in the calculation of the number of rotations on a drive target, even when the abnormality is caused in the number of rotations of the detection target.

According to another aspect of the present disclosure, even when the rotation number detected by the detection unit has an abnormality, the calculation of the rotation information is continuable, while suppressing the influence of the abnormality of the rotation number on the drive object.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

Figure 1:
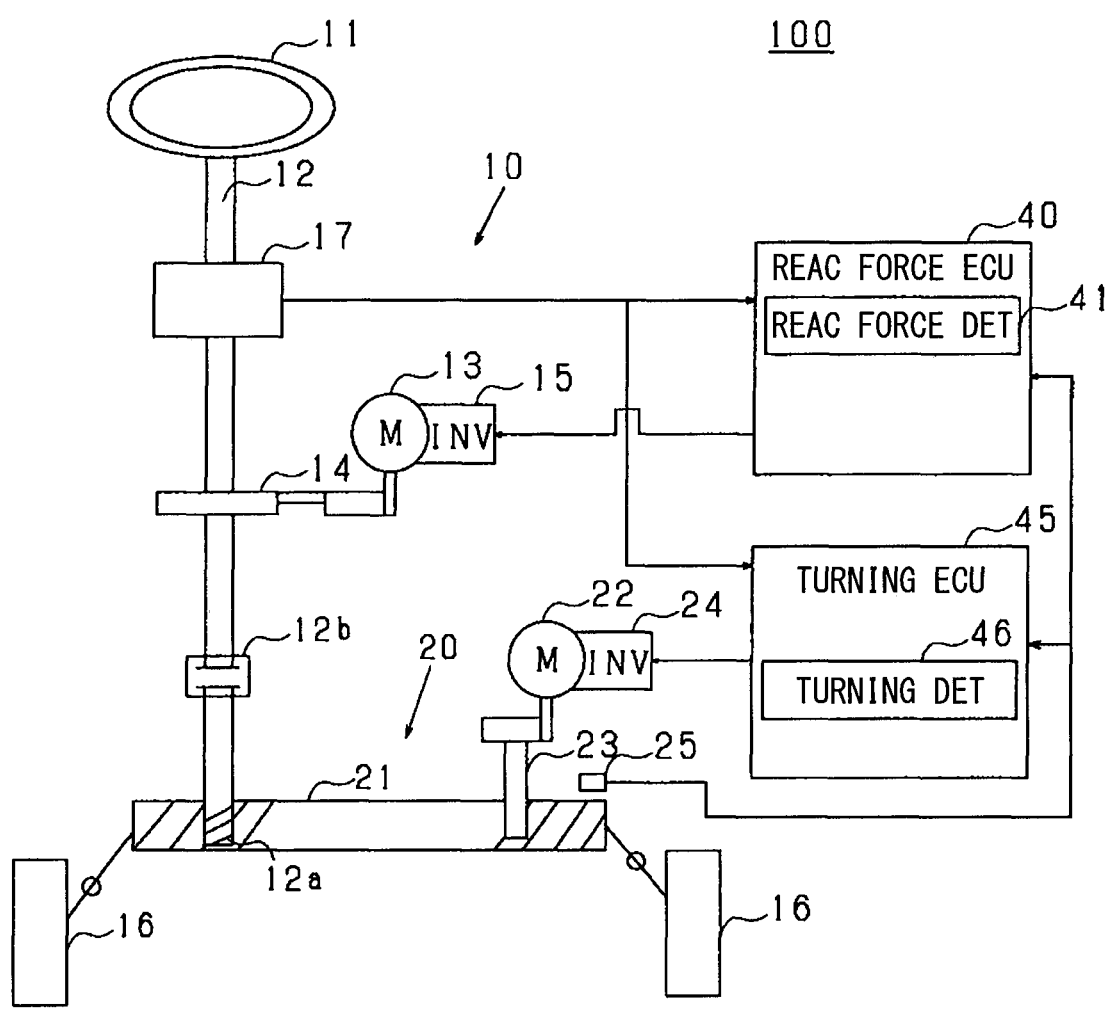
FIG. 1 is a schematic diagram of a steering system.

Hereinafter, a steer-by-wire steering system applied to a vehicle is described as a steering system according to the present embodiment. A steering system 100 shown in FIG. 1 includes a steering device 10 that receives a driver's steering operation, and a turning device 20 that turns a direction of tires 16 according to the amount of steering operation received by the steering device 10.

The steering device 10 includes a steering wheel 11 which is rotated by a driver, a steering shaft 12 which is rotated with the rotation of the steering wheel 11, and a reaction force motor 13. The reaction force motor 13 is connected to the steering shaft 12 via a steering side speed reduction gear 14, and applies a reaction force according to the driver's operation of the steering wheel 11. In the present embodiment, the reaction force motor 13 is an alternating current (AC) motor that is rotationally driven by AC electric power. Further, the reaction force motor 13 is connected to a battery via an inverter 15. The inverter 15 converts a direct current (DC) electric power from the battery into the AC power and supplies electric power to the reaction force motor 13.

In the present embodiment, a pinion shaft 12a is provided on a tip end side of the steering shaft 12 via a clutch 12b. During normal operation of the vehicle, the clutch 12b is in an open state, and the rotation of the steering shaft 12 is not transmitted to the pinion shaft 12a. For example, when the clutch 12b is closed due to an abnormality or the like of the steering system 100, the rotation of the steering shaft 12 is transmitted to the pinion shaft 12a.

The turning device 20 includes a rack shaft 21 that changes the direction of the tires 16 and a turning motor 22. The tires 16 are connected to both ends of the rack shaft 21 via tie rods. The turning motor 22 is connected to the rack shaft 21 via the turning side speed reduction gear 23, and applies a turning force which is a force to change the direction of the tire 16 to the rack shaft 21. The turning motor 22 is connected to the battery via the inverter 24. The inverter 24 converts a direct current electric power from the battery into an alternating current electric power, and supplies electric power to the turning motor 22.

In the present embodiment, the pinion shaft 12a engages with the rack shaft 21. When the clutch 12b is in an open state, the steering shaft 12 is not mechanically connected to the rack shaft 21. Therefore, the rotation of the steering shaft 12 accompanying the driver's operation of the steering wheel 11 is not converted into a linear motion of the rack shaft 21. On the other hand, in a closed state of the clutch 12b, the steering shaft 12 is mechanically connected to the rack shaft 21. Therefore, the rotational motion of the steering shaft 12 accompanying the driver's operation of the steering wheel 11 is converted into the linear motion of the rack shaft 21.

The steering shaft 12 of the steering device 10 is provided with a torque sensor 17 that detects a steering torque according to the driver's steering operation. Further, on the rack shaft 21 of the turning device 20, a rack stroke sensor 25 for detecting a displacement amount X which is an amount of a linear motion of the rack shaft 21 is provided.

The steering system 100 includes a reaction force ECU 40 as a reaction force controller, and a turning ECU 45 as a turning controller. The reaction force ECU 40 and the turning ECU 45 respectively have a central process unit (CPU: not shown) and a memory (not shown), and a program stored in the memory and executed by the CPU controls power supply to the reaction force motor 13 and the turning motor 22.

The reaction force ECU 40 calculates a reaction force torque instruction value, i.e., an instruction of torque to the reaction force motor 13, based on (i) a reaction force absolute angle A1 indicating a rotation amount (i.e., an absolute angle) of the steering shaft 12 accompanying the driver's steering operation, (ii) a steering torque Th and (iii) a vehicle speed Vc. Further, based on the reaction force torque instruction value, an operation signal for operating the inverter 15 is calculated. The absolute angle is a value that indicates the rotation angle of the steering wheel 11 for rotating the steering wheel 11 from a neutral position corresponding to a straight travel of the vehicle to a position corresponding to a right-most limit turn angle or a left-most limit turn angle of the tires 16.

The reaction force ECU 40 includes, as a rotation detection device, a reaction force detector 41 that calculates a reaction force absolute angle A1 based on a detection value indicating a rotation state of the reaction force motor 13. The reaction force detector 41 calculates, as detection values, a rotation angle θm1 of the reaction force motor 13 and a rotation number TC1 indicating the number of rotations of the reaction force motor 13 by a unit of a predetermined angle (e.g., by a unit of 360 degrees). For example, the reaction force motor 13 is provided with a magnet that rotates integrally with the rotor or with the rotation shaft, and the reaction force detector 41 calculates the rotation angle θm1 and the rotation number TC1 of the motor 13 based on the change of the magnetic field caused by the rotation of the magnet.

The turning ECU 45 calculates a turning torque instruction value as an instruction of torque to the turning motor 22 based on (i) a turning absolute angle A2 indicating the rotation amount (i.e., an absolute angle of rotation) of the steering shaft 12, (ii) the displacement amount X, (iii) the steering torque Th, and (iv) the vehicle speed Vc. Then, based on the turning torque instruction value, an operation signal for operating the inverter 24 is calculated.

The turning ECU 45 includes, as a rotation detection device, a turning detector 46 that calculates the turning absolute angle A2 based on a detection value indicating the rotation state of the turning motor 22. The turning detector 46 calculates, as detection values, the rotation angle θm2 of the turning motor 22 and the rotation number TC2 indicating the number of rotations of the turning motor 22 by a unit of a predetermined angle (e.g., by a unit of 360 degrees).

For example, the turning motor 22 is provided with a magnet that rotates integrally with the rotor or with the rotation shaft, and the turning detector 46 calculates the rotation angle θm2 and the rotation number TC2 of the turning motor 22 based on the change of the magnetic field caused by the rotation of the magnet.

Figure 2A:
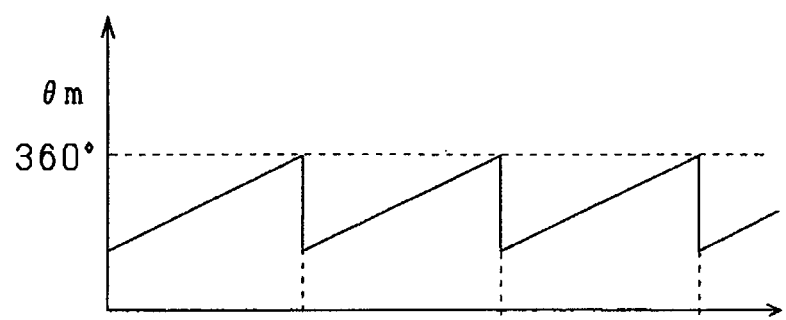
FIGS. 2A, 2B, 2C are collectively used as a diagram of a relationship between a rotation angle, a number of rotations and an absolute angle.
Figure 2B:
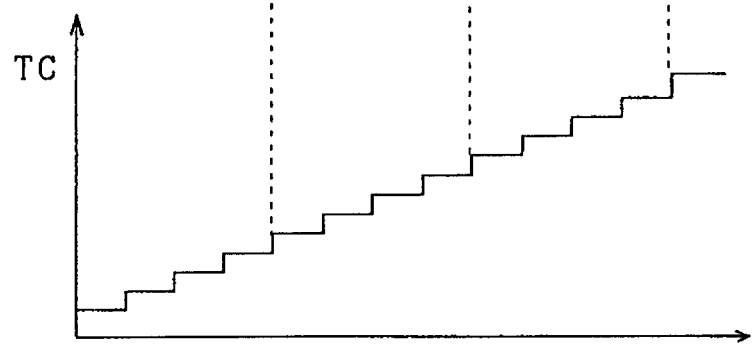
Figure 2C:
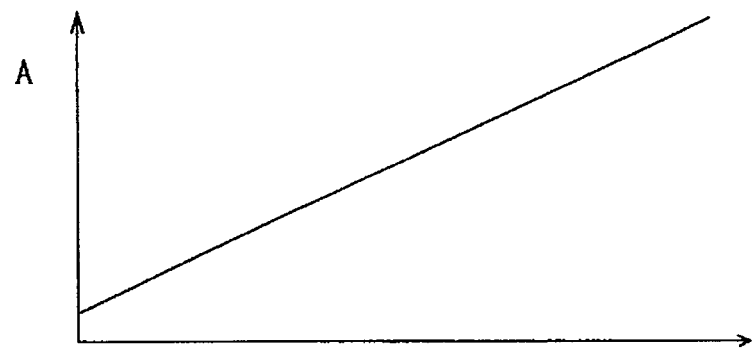

FIG. 2A shows an example of the rotation angle θm (e.g., θm1 or θm2), FIG. 2B shows the rotation number TC (e.g., TC1 or TC2), and FIG. 2C shows the absolute angle A (e.g., A1 or A2).

A gear ratio for the steering shaft 12 is set to a value so that the steering shaft 12 rotates more than once (i.e., more than 360 degrees) while the steering wheel 11 is rotated from the neutral position to the position corresponding either to the right-most or the left-most limit turn angle of the tire 16. On the other hand, the rotation angle θm indicates the rotation angle of up to one rotation of each of the motors 13, 22 (i.e., up to 360°). Therefore, it may be understood that the rotation angle θm is a relative angle in comparison to the absolute angle A. Further, the rotation number TC is a value counted up for rotation of every angle area, which may be an area defined by dividing one rotation of each of the motors 13 and 22 (i.e., 360°) by a preset number. That is, in the present embodiment, an angle range is set as a range of 90 degrees, and the rotation number TC is counted up by the rotation of every 90 degrees of the motors 13, 22.

In the present embodiment, the absolute angle A is calculated from the rotation angle θm and the rotation number TC using the following equation (1).

$$A = \text{INT}(TC/k) \times 360 + \theta m \qquad (1)$$

INT(TC/k) represents an integer part of a quotient obtained by dividing the rotation number TC by the number k (i.e., the rotation number TC per one rotation of the motors 13, 22). For example, k is 4 if a count interval of 90° is being set for determining an angle range of the rotation number TC.

The reaction force ECU 40 learns a neutral position Ma of the steering wheel 11, which is used for a control of the reaction force motor 13, by using the reaction force absolute angle A1 calculated by the reaction force detector 41 in a straight travel of the vehicle for a preset period of time. The turning ECU 45 learns a neutral position Mb of the steering wheel 11, which is used for a control of the turning motor 22, by using the turning absolute angle A2 calculated by the turning detector 46 in a straight travel of the vehicle for a preset period of time.

Here, when an abnormality occurs in the rotation number TC calculated by the detectors 41 and 46, the absolute angle A (i.e., A1 or A2 in the present embodiment) which is rotation information calculated based on the rotation number TC and the rotation angle θm may be not a value for properly controlling each of the motors 13 and 22.

Therefore, in consideration of vehicle safety, it is conceivable to forcibly stop the calculation of the absolute angle A when it is determined that the rotation number TC has an abnormality. However, by stopping the calculation of the absolute angle A, the control of the steering system 100 cannot be continuable, thereby leading to the stop of the vehicle.

Therefore, the reaction force detector 41 and the turning detector 46 are, upon determining an abnormality of the detection values including the rotation number TC, configured to output an absolute angle A calculated without using the abnormal rotation number TC as the absolute angle A for controlling each of the motors 13, 22.

Figure 3:
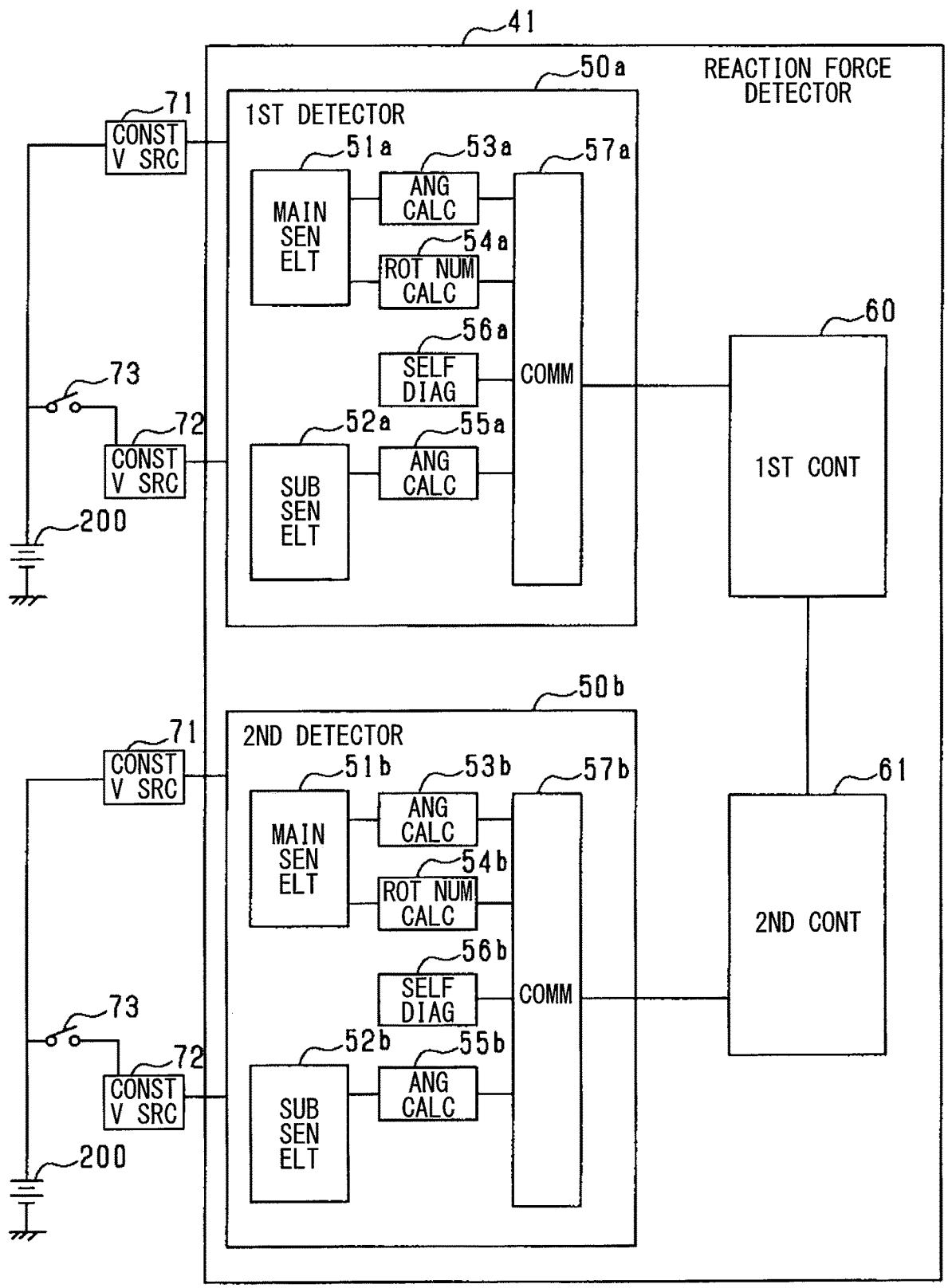
FIG. 3 is a block diagram of a reaction force detector.

Next, specific configurations of the reaction force detector 41 and the turning detector 46 are described. As shown in FIG. 3, the reaction force detector 41 includes a first detector 50a and a second detector 50b that calculate detection values according to the rotation of the reaction force motor 13, and includes a first control unit 60 and a second control unit 61.

The first detector 50a includes a main sensor element 51a, a sub sensor element 52a, an angle calculator 53a, a rotation number calculator 54a, an angle calculator 55a, a self-diagnosis unit 56a, and a communication unit 57a.

The angle calculator 53a calculates the rotation angle θm of the reaction force motor 13 based on an output value from the main sensor element 51a. The angle calculator 55a calculates the rotation angle θm of the reaction force motor 13 based on an output value from the sub sensor element 52a. The rotation number calculator 54a calculates the rotation number TC of the reaction force motor 13 based on an output value of the main sensor element 51a. The rotation angle calculated by the angle calculator 53a may be designated as a rotation angle θm1, and the rotation angle calculated by the angle calculator 55a may be designated as a rotation angle θm2, for the distinction therebetween.

The self-diagnosis unit 56a monitors a power supply abnormality such as a power fault or a ground fault regarding each of the sensor elements 51a and 52a, each of the angle calculators 53a and 55a, and the rotation number calculator 54a. Further, the self-diagnosis unit 56a outputs a result of a self-diagnosis as a status signal SS.

The communication unit 57a is provided as, for example, a serial interface, and can communicate with the first control unit 60. The communication unit 57a receives the rotation angle θm1, the rotation number TC1, and the status signal SS1, and generates an output signal including the values θm1, TC1, and SS1. The communication unit 57a outputs an output signal to the first control unit 60 by digital communication such as SPI (Serial Peripheral Interface) communication. In the present embodiment, the communication unit 57a outputs an output signal to the first control unit 60 in response to a request from the first control unit 60. A communication frame of the output signal includes, in addition to the rotation angle θm1, the rotation number TC1, and the status signal SS1, a run counter signal and a CRC signal as an error detection signal. Note that the error detection signal may be other than a CRC signal, such as a checksum signal or the like.

The second detector 50b includes a main sensor element 51b, a sub sensor element 52b, an angle calculator 53b, a rotation number calculator 54b, an angle calculator 55b, a self-diagnosis unit 56b, and a communication unit 57b. The functions of the units 51b to 57b that constitute the second detector 50b are the same as the functions of the units 51a to 57a that constitute the first detector 50a, and thus the description thereof is omitted.

The first control unit 60 is connected to the first detector 50a, and uses the rotation angle θm1 and the rotation number TC1 included in the output signal from the first detector 50a to calculate the reaction force absolute angle A1. The second control unit 61 is connected to the second detector 50b, and uses the rotation angle θm2 and the rotation number TC2 included in the output signal from the second detector 50b to calculate the reaction force absolute angle A2.

The first control unit 60 and the second control unit 61 can communicate using, for example, known microcontroller communication. When an output signal is communicated between the first control unit 60 and the second control unit 61, a frame used for communication includes a run counter signal and a cyclic redundancy check (CRC) signal as an error detection signal. Therefore, by using the CRC signal, it can be determined whether or not there is a communication abnormality between the first control unit 60 and the second control unit 61. Note that the error detection signal may be other than a CRC signal, such as a checksum signal or the like.

The first and second control units 60 and 61 correspond to an information control unit, and calculate an absolute angle by using the rotation angle θm and the rotation number TC. In the present embodiment, a "system" is defined as a combination of first and second detectors 50a~50d and first and second control units 60, 61 for the calculation of the absolute angle by using the detection values θm and TC calculated by the first and second detectors 50a to 50d. Further, from among a plurality of systems, a system predetermined as a combination for outputting an absolute angle that is used for the calculation of the reaction force motor 13 is referred to as a subject system.

The first and second control units 60 and 61 monitor the presence or absence of abnormality in the rotation number TC based on the rotation angle θm and the rotation number TC calculated by the rotation number calculators 54a and 54b. In the present embodiment, the first and second control units 60 and 61 calculate an estimation number AT as an estimation of the rotation number TC of the reaction force motor 13 based on the rotation angles θm calculated by the angle calculators 53a to 55b, and, determine that the rotation number TC is abnormal when the calculated rotation number TC is different from the estimation number AT. Therefore, the first and second control units 60 and 61 correspond to a monitor unit.

Figure 4A:
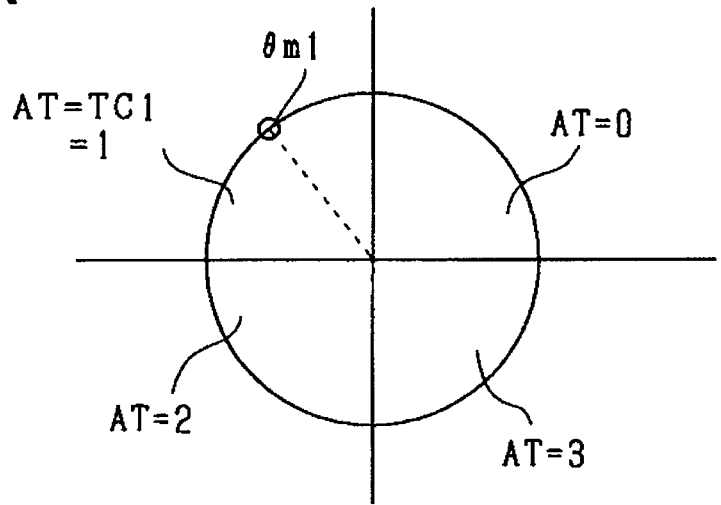
FIGS. 4A/4B/4C are respectively a diagram of how abnormality of the number of rotations is determined.
Figure 4B:
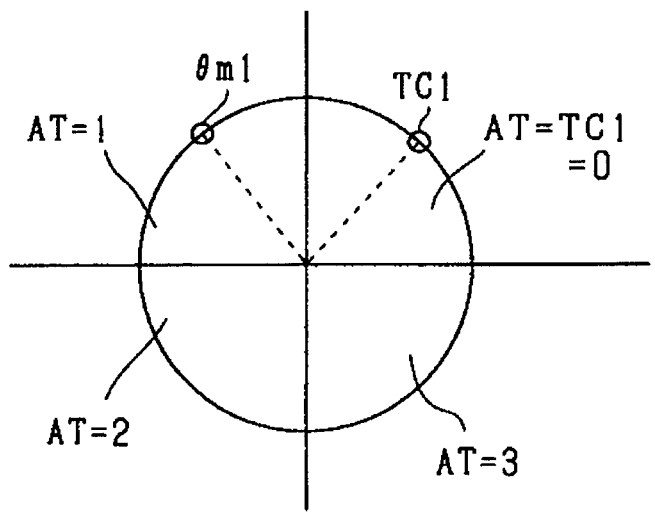
Figure 4C:
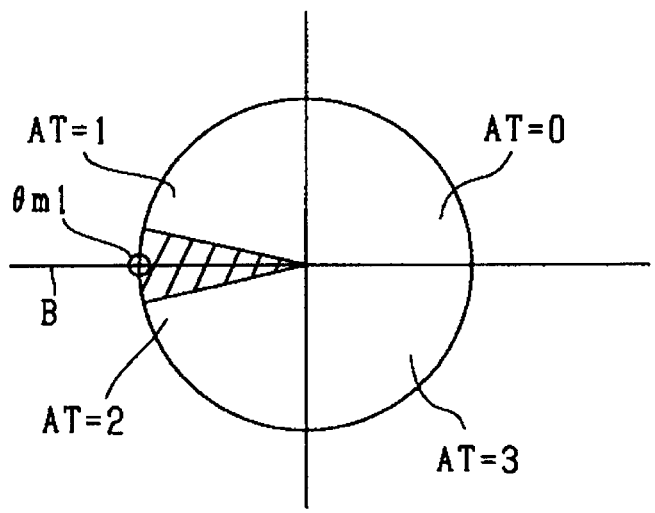

FIGS. 4A, 4B, 4C are diagrams illustrating how abnormality of the rotation number TC is determined. That is, FIG. 4A is a diagram of a relationship between the rotation number TC and the rotation angle θm when the count interval of the rotation number TC is set to 90° and the rotation number TC is normal. FIG. 4B shows a relationship when the rotation number TC is abnormal. The rotation angle calculated by the angle calculator 53a is represented a "θm1," and the number of rotations calculated by the number calculator 54a is represented as "TC1."

When the rotation angle θm1 calculated by the angle calculator 53a is equal to or greater than 90° and is equal to or less than 180° (for example, θm1=130°) as shown in FIG. 4A, the estimation number AT estimated based on the rotation angle θm1 and the number of rotations TC1 have the same value if the rotation number TC1 is normal. On the other hand, as shown in FIG. 4B, when the rotation number TC1 is abnormal, the estimation number AT estimated based on the rotation angle θm1 and the rotation number TC1 have different values. Note that, in FIG. 4B, while the estimation number AT is "1," the rotation number TC1 is "0."

The first and second control units 60 and 61 first identify the estimation number AT regarding the rotation number TC, which can be estimated from the rotation angle θm1. For example, the first and second control units 60 and 61 store the correspondence between the rotation angle θm1 and the estimation number AT as a table, and by referring to such table, the estimation number AT can be calculated from the rotation angle θm1. The rotation number TC may also designated as a rotation number TC hereafter, and the estimated number of rotations AT may also be designated as an estimation number AT hereafter.

In the present embodiment, the first and second control units 60 and 61 normalize the rotation number TC to a value within one rotation of the reaction force motor 13 so that the rotation number TC can be compared with the estimation number AT. More practically, the rotation number TC is converted into a normalization value MOD by using the following equation (2).

$$\text{MOD}=\text{MOD}(TC,k) \qquad (2)$$

"MOD(TC, k)" represents a remainder obtained by dividing the rotation number TC by k, which is the number of rotations per one rotation of the reaction force motor 13. In the present embodiment, k=4.

If the rotation angle θm coincides with a multiple of the count interval of the rotation number TC, the estimation number AT estimated based on such rotation angle θm is set as either one of the two rotation numbers TC defined by two angle ranges of rotation angle, which are interposed with a boundary B. In FIG. 4C, since the rotation angle θm1 is 180° (=90°×2), which is a multiple of an angle 90° of a count interval, in view of an error between the rotation angle θm and the rotation number TC taken into consideration, the estimation number AT is either 1 or 2. In such a case, the estimation number AT estimated by the rotation angle θm is set as two estimation numbers AT represented by two angle ranges facing the boundary B. In FIG. 4C, the estimation number AT is set to 1 and 2. Note that an error between the rotation angle θm1 and the rotation number TC is caused, for example, due to the characteristics of a calculation circuit that calculates each of the detection values θm1 and TC.

When the first control unit 60 calculates the reaction force absolute angle A1 for controlling the reaction force motor 13, if it is determined that an abnormality is occurring or is occurring in the rotation number TC of the subject system, the reaction force absolute angle A1 calculated by the second control unit 61 in another system in view of the subject system is output as an absolute angle for controlling the reaction force motor 13. Alternatively, when the second control unit 61 calculates the reaction force absolute angle A1 for controlling the reaction force motor 13, if it is determined that the rotation number TC of the subject system (i.e., in this case a system including the second control unit 61) is abnormal, the reaction force absolute angle A1 calculated by the first control unit 60 (i.e., in another system in view of the system including the second control unit 61) is output as an absolute angle for controlling the reaction force motor 13.

Figure 5:
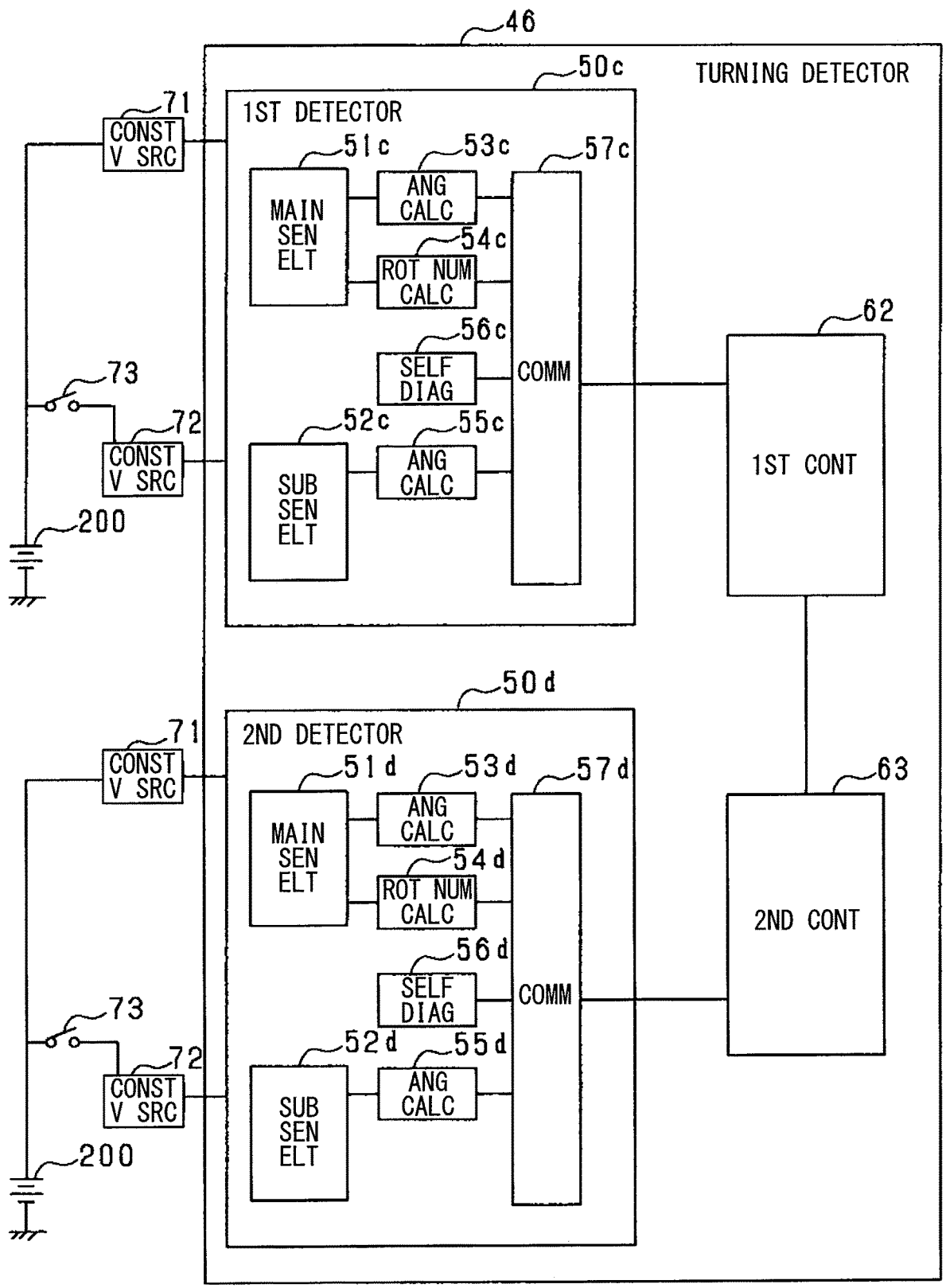
FIG. 5 is a block diagram of a turning detector.

As shown in FIG. 5, the turning detector 46 of the turning ECU 45 includes a first detection unit 50c that calculates the detection values θm and TC according to the rotation of the turning motor 22, and a second detection unit 50d. The first and second detection units 50c and 50d included in the turning detector 46 have basically the same function as the first and second detection units 50a and 50b in the reaction force detector 41, detecting the rotation of the turning motor 22 instead of the rotation of the reaction force motor 13. Therefore, the detailed description of the turning detector 46 is omitted.

A first control unit 62 of the turning detector 46 calculates the turning side absolute angle A2 by using the detection values θm1 and TC1 included in the output signal detected by the first detection unit 50c. A second control unit 63 of the turning detector 46 calculates the turning absolute angle A2 by using the detection values θm2 and TC2 included in the output signal detected by the second detection unit 50d.

The first and second control units 62 and 63 of the turning detector 46 use a comparison result of a comparison between the rotation angle θm and the rotation number TC to determine whether the rotation number TC used for calculating the turning absolute angle A2 is abnormal. Since the determination of abnormality of the rotation number TC performed by the first and second control units 62 and 63 of the turning detector 46 is basically the same as the determination performed by the first and second control units 60 and 61 of the reaction force detector 41, details of such determination are omitted. When it is determined by the first control unit 62 that an abnormality is occurring in the rotation number TC used to calculate the turning absolute angle A2, the first control unit 62 outputs the turning absolute angle A2 calculated by the second control unit 63 as an absolute angle for controlling the turning motor 22. When it is determined by the second control unit 63 that an abnormality is occurring in the rotation number TC used for calculation of the turning absolute angle A2, the second control unit 63 outputs the turning absolute angle A2 calculated by the first control unit 62 as an absolute angle for controlling the turning motor 22.

Electric power is supplied to the reaction force detector 41 and the turning detector 46 from a battery 200 via constant voltage sources 71 and 72. In the present embodiment, the electric power from the battery 200 is supplied to each of the rotation number calculators 54a to 54d via the constant voltage source 71 without passing through a System Main Relay (SMR) 73. That is, even when the SMR 73 is in the open state due to an ignition switch being turned OFF, the rotation number calculators 54a to 54d can receive, continuously, the supply of electric power from the battery 200, and calculation of the number of rotations TC is continuable. On the other hand, when the SMR 73 is in the open state, the electric power from the battery 200 is not supplied to the angle calculators 53a to 53d and 55a to 55d, thereby the rotation angle θm is not calculable.

Figure 6:
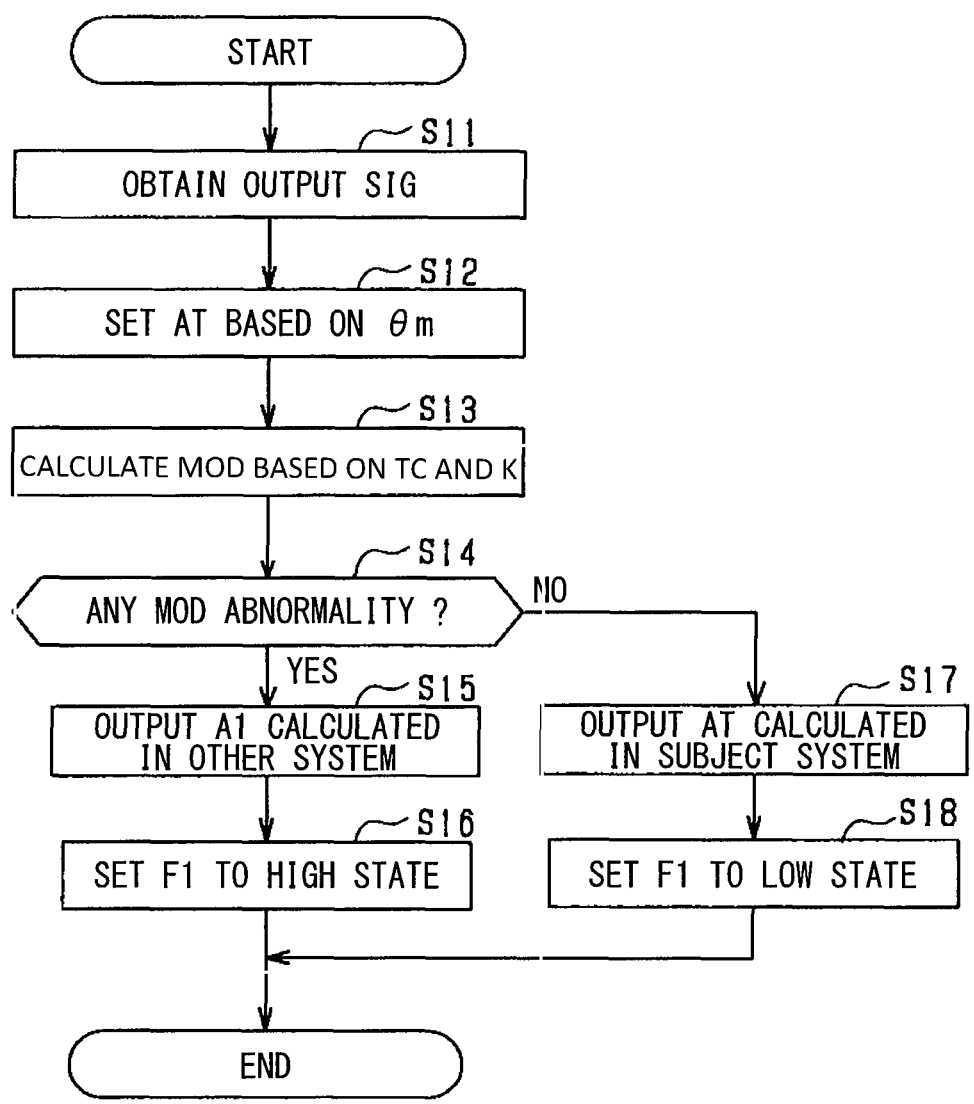
FIG. 6 is a flowchart of a calculation procedure of a reaction force absolute angle.

Next, the calculation of the reaction force absolute angle A1 performed by the reaction force ECU 40 is described with reference to FIG. 6. The process shown in FIG. 6 is repeatedly performed by the first control unit 60 of the reaction force detector 41 in a predetermined cycle.

At step S11, the output signal from the first detector 50a is obtained. At step S12, from among the detection values θm included in the output signal, the estimation number AT is set based on the rotation angle θm used to calculate the reaction force absolute angle A1.

At step S13, a normalization value MOD is calculated, which is a value that is normalized from the rotation number TC that is used for the calculation of the reaction force absolute angle A1.

At step S14, it is determined whether or not the rotation number TC used for the calculation of the reaction force absolute angle A1 is abnormal, based on the estimation number AT set at step S12 and the normalization value MOD calculated at step S13. Steps S11 to S14 correspond to a monitor unit.

When it is determined at step S14 that no abnormality is occurring in the rotation number TC used to calculate the reaction force absolute angle A1, then at step S17, the reaction force absolute angle A1 calculated by using the rotation angle θm and the rotation number TC included in the output signal obtained at step S11 is output as an absolute angle for controlling the reaction force motor 13. Therefore, the reaction force absolute angle A1 is calculated by using the rotation angle θm and the rotation number TC calculated by the first detector 50a, which is in the subject system. Steps S15 and S17 correspond to an output controller.

Step S18 sets an abnormality notification flag F1 to a low state. The abnormality notification flag F1 indicates the presence or absence of an abnormality in the rotation number calculators that calculate the rotation number TC, and indicates (i) that the abnormality is occurring in the rotation number calculator in the high state, and (ii) that no abnormality is occurring in the rotation number calculator in the low state.

When it is determined at step S14 that an abnormality is occurring in the rotation number TC, then at step S15, the reaction force absolute angle A1 obtained by communication from the second control unit 61, which is another system in view of the subject system, is output as an absolute angle for controlling the reaction force motor 13.

In a situation where the reaction force detector 41 has an abnormality, it is desirable to promptly notify the driver of the abnormality in consideration of vehicle safety. Therefore, at step S16, the abnormality notification flag F1 is set to a high state, indicating an abnormality occurring situation in which the reaction force detector 41 has abnormality. Then, the series of processes shown in FIG. 6 is once ended.

Figure 7:
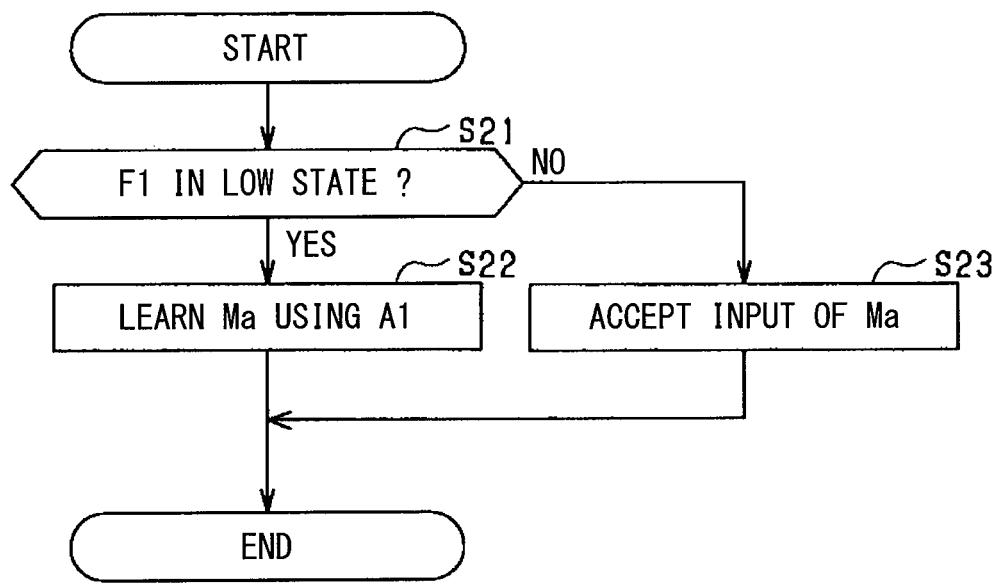
FIG. 7 is a flowchart of a calculation procedure of a neutral position.

Next, storage of the neutral position Ma using the reaction force absolute angle A1 calculated by the process of FIG. 6 is described with reference to FIG. 7. The process shown in FIG. 7 is performed by the reaction force ECU 40, for example, in a condition where the ignition switch of the vehicle is turned ON.

At step S21, it is determined whether the abnormality notification flag F1 is in the low state. When it is determined that the abnormality notification flag F1 is in the low state, the process proceeds to step S22. In such case, since no abnormality is occurring in the reaction force detector 41, the neutral position Ma is learned at step S22 by using the reaction force absolute angle A1.

The devices of the reaction force side (e.g., devices in the reaction force detector 41) are considered to be less affected by the abnormality of the reaction force detector 41 than the devices of the turning mechanism (e.g., devices in the turning detector 46) in terms of the influence on the travel of the vehicle. Therefore, when it is determined that the abnormality notification flag F1 is in the high state at step S21, the travel of the vehicle is prioritized at step S23 by accepting an input of the neutral position Ma from the driver. For example, by prioritizing the travel of the vehicle, the driver can quickly take the vehicle to a maintenance factory or the like, and have a serviceman or the like repair the abnormality of the reaction force detector 41.

Then, the series of processes shown in FIG. 6 is once ended.

The following effects may be achievable according to the embodiment described above.

The first and second control units 60 and 61 monitor the abnormality of the rotation number TC calculated by the first and second detection units 50a, 50b based on the comparison result of comparison between the predetermined rotation angle θm and the rotation number TC calculated by the rotation number calculators 54a and 54b. When it is determined that an abnormality is occurring in the rotation number TC calculated by the detector of the subject system, the reaction force absolute angle A1 calculated by the second control unit 61 in the other system different from the subject system is output. In such manner, even when an abnormality is occurring in the rotation number TC detected by using each of the detection units 50a and 50b, the calculation of the absolute angle is continuable while suppressing the adverse effect or influence of the abnormality of the rotation number TC on the travel of the vehicle.

The first and second control units 60 and 61 calculate the estimation number AT estimated as the rotation number TC of the reaction force motor 13, based on the rotation angles θm calculated by the angle calculators 53a to 55b, and, when the rotation number TC (e.g., TC1 and TC2) calculated by the rotation number calculators 54a and 54b is different from the estimation number AT, it is determined that the rotation number TC is abnormal. In other words, the presence or absence of abnormality in the rotation number TC is determined by using the estimation number AT calculated based on the rotation angle θm accompanying/derived from the actual rotation of the reaction force motor 13. In such manner, the presence or absence of abnormality of the rotation number TC according to the actual rotation angle θm calculated by the detection units 50a and 50b is suitably determinable.

The reaction force ECU 40 stores a value input by the driver as the neutral position Ma when it is determined that the reaction force detector 41 is abnormal. In such manner, the travel of the vehicle is made continuable (i.e., stranding of the vehicle is preventable).

Modification of the First Embodiment

When the abnormality notification flag F1 is in the high state, the reaction force ECU 40 may continue to learn the neutral position Ma of the reaction force motor 13 by using the reaction force absolute angle A1 calculated at step S15. In such manner, the travel of the vehicle is made continuable (i.e., stranding of the vehicle is preventable).

The first and second control units 60 and 61 may calculate an estimated rotation angle Aθ estimated as the rotation angle θm of the reaction force motor 13 based on the rotation number TC calculated by the rotation number calculators 54a and 54b, and, when the degree of difference between the rotation angle θm calculated by the angle calculators 53a to 55b and the estimated rotation angle Aθ is greater than a predetermined degree, the rotation number TC may be determined as abnormal.

In such case, at step S12 of FIG. 6, the rotation angle θm to be used to calculate the reaction force absolute angle A1 is obtained. At step S13, the estimated rotation angle Aθ is set by using the rotation number TC to be used to calculate the reaction force absolute angle A1. For example, the first and second control units 60 and 61 respectively store a table that defines the correspondence between the rotation number TC and the estimated rotation angle Aθ, and the estimated rotation angle Aθ is obtained from such table according to the rotation number TC. At step S14, the degree of difference between the rotation angle θm obtained at step S12 and the estimated rotation angle Aθ set at step S13 is determined. More practically, when the angle difference between the estimated rotation angle Aθ and the rotation angle θm is equal to or less than a predetermined threshold value, it is determined that the rotation number TC has no abnormality, based on such small degree of difference. On the other hand, when the angle difference between the estimated rotation angle Aθ and the rotation angle θm is greater than a predetermined threshold value, it is determined that the rotation number TC is abnormal, based on such great degree of difference. The threshold value for determining the degree of difference may be determined in consideration of, for example, an error of the rotation angle θm.

Second Embodiment

The second embodiment is different from the first embodiment as described below. In the second embodiment, same structural parts have the same reference numbers as the first embodiment for simplification of the description.

In the steering control of the vehicle, it is considered that, when the turning detector 46 has an abnormality, and if we divide a steering system into two (i.e., a tire turning side and a reaction generation side), the tire turning mechanism has a higher influence on the travel of the vehicle than the reaction force generation mechanism in terms of steering control of the vehicle. Therefore, in the present embodiment, when it is determined that an abnormality is occurring in the rotation number calculators 54c and 54d of the turning detector 46, the neutral position Mb is set differently when the turning detector 46 has the abnormality than when having an abnormality in the reaction force generation mechanism.

Figure 8:
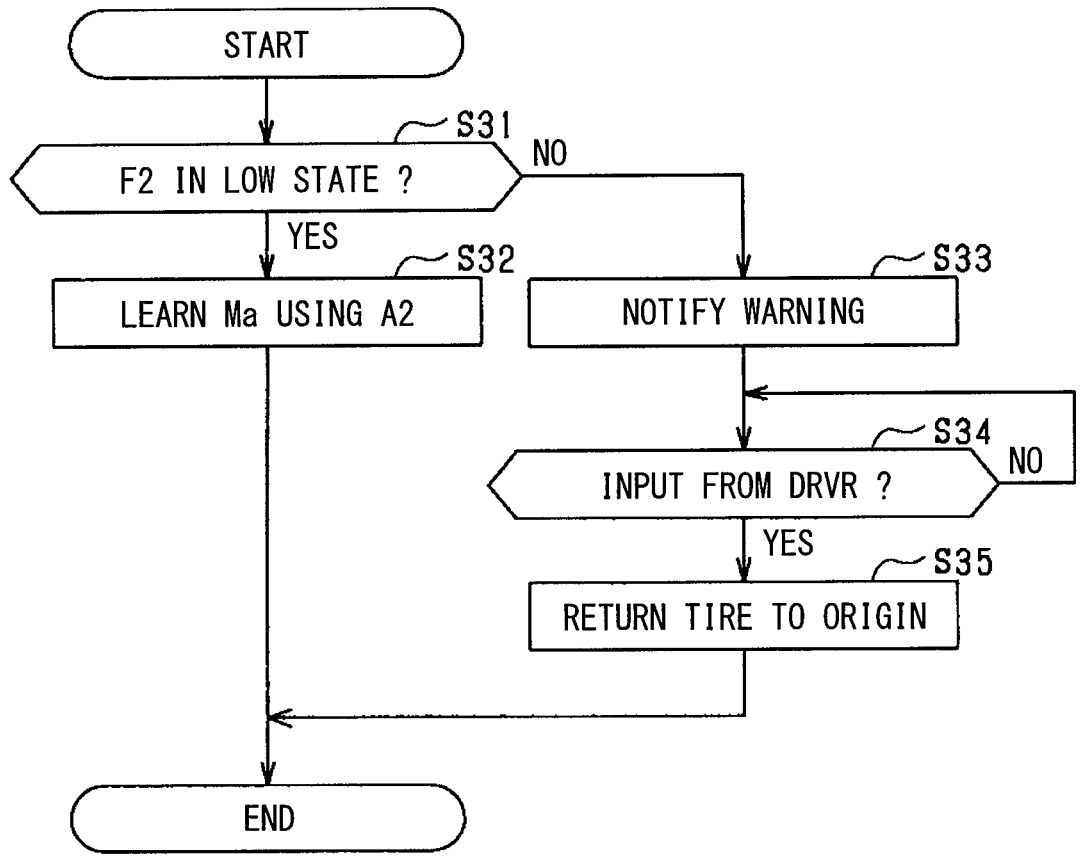
FIG. 8 is a flowchart of the calculation procedure of the neutral position according to a second embodiment of the present disclosure.

The process shown in FIG. 8 is performed by the turning ECU 45 in a predetermined cycle. The process shown in FIG. 8 is performed by the turning ECU 45, for example, in a condition where the ignition switch of the vehicle is turned ON.

At step S31, it is determined whether the abnormality notification flag F2 is in the low state. Note that the abnormality notification flag F2 is set at steps S16 and S18 by the first control unit 62 of the turning detector 46 performing the process of FIG. 6. When it is determined that the abnormality notification flag F2 is in the low state, the process proceeds to step S32, and the neutral position Mb is learned by using the turning absolute angle A2.

On the other hand, when it is determined that the abnormality notification flag F2 is in the high state, a warning is notified to the driver at step S33. For example, when a monitor (i.e., a display device) is installed in a vehicle compartment, an icon or the like is displayed on the monitor to indicate that an abnormality is occurring in the turning detector 46. Step S33 corresponds to a warning provider.

At step S34, it is determined whether an input from the driver has been received for returning the direction of the tire 16 to an origin. The origin of the tire 16 is a direction of the tire 16 determined in advance for a straight travel of the vehicle. When an input from the driver is received for returning the direction of the tire 16 to the origin, the process proceeds to step S35, and the rotation of the turning motor 22 is controlled to align the direction of the tire 16 to a direction according to the origin (i.e., to a direction of the straight travel of the vehicle).

The following effects are achievable in the present embodiment described above.

The tire turning mechanism is considered as having a higher influence on the travel of the vehicle than the reaction force mechanism when having abnormality in the turning detector 46. Therefore, the turning ECU 45 warns the driver when it is determined that an abnormality is occurring in the rotation number calculators 54c and 54d of the turning detector 46. In such case, the driver is notified about the abnormality of the turning detector 46, i.e., for recognition by the driver that the abnormality may affect the tire direction control, thereby influencing the steering operation of the driver.

When the turning ECU 45 determines that an abnormality is occurring in the turning detector 46, the turning motor 22 is controlled to change the direction of the tire 16 to a preset direction for the straight travel of the vehicle. In such case, even when an abnormality is occurring in the calculator of the turning detector 46, the travel of the vehicle is continuable with the direction of the tire 16 returned to the origin (i.e., a straight travel of the vehicle is guaranteed).

Third Embodiment

The third embodiment is different from the first embodiment as described above. In the third embodiment, the same structural parts have the same reference numbers as the first embodiment for simplification of the description.

Figure 9:
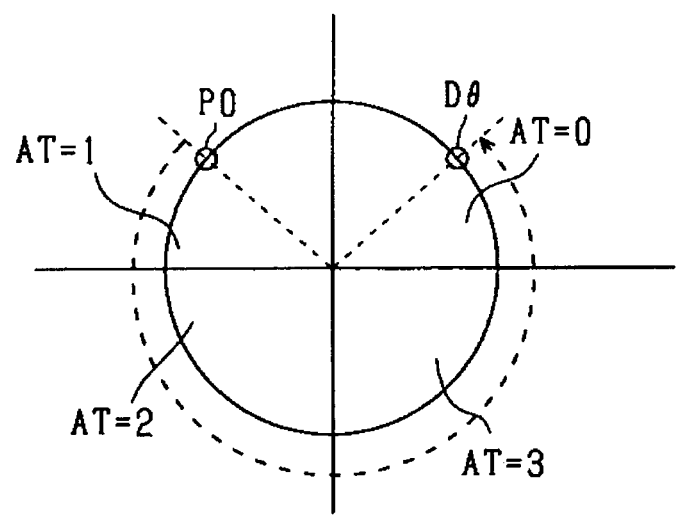
FIG. 9 is a diagram of how an abnormality of the number of rotations is determined according to a third embodiment of the present disclosure.

As an abnormality in the rotation number TC, there may be a sticking abnormality in which the rotation number TC does not change from a predetermined value even when the motors 13 and 22 are rotated, or a detection value dropping in which a certain range of values will not be detected. FIG. 9 is a diagram of how an abnormality of the number of rotations (i.e., the rotation number) TC is determined in principle. For example, when the rotation angle θm of the reaction force motor 13 changes in a range from an initial position P0 to 360°, the estimation number AT changes in an order of 0, 1, 2, 3. Therefore, when the rotation number TC is normal, the rotation number TC (MOD) also changes in an order of 0, 1, 2, 3. On the other hand, for example, when the rotation number TC does not change from "1" (i.e., when sticking to "1"), it is observed that a sticking abnormality is occurring in the rotation number TC. Further, when the rotation number TC changes from 0, to 2 and 3, i.e., when the rotation number TC does not change to "1," there is a dropping of a certain value from the detection values.

In the present embodiment, the first and second control units 60 and 61 determine that the rotation number TC is abnormal when the rotation number TC calculated by the rotation number calculators 54a and 54b during a rotation of the reaction force motor 13 by an amount of a determination rotation angle D indicating that a preset rotation angle θm does not change to have each of all values respectively corresponding to the rotation of the motor 13 by the amount of the determination rotation angle Dθ.

Figure 10:
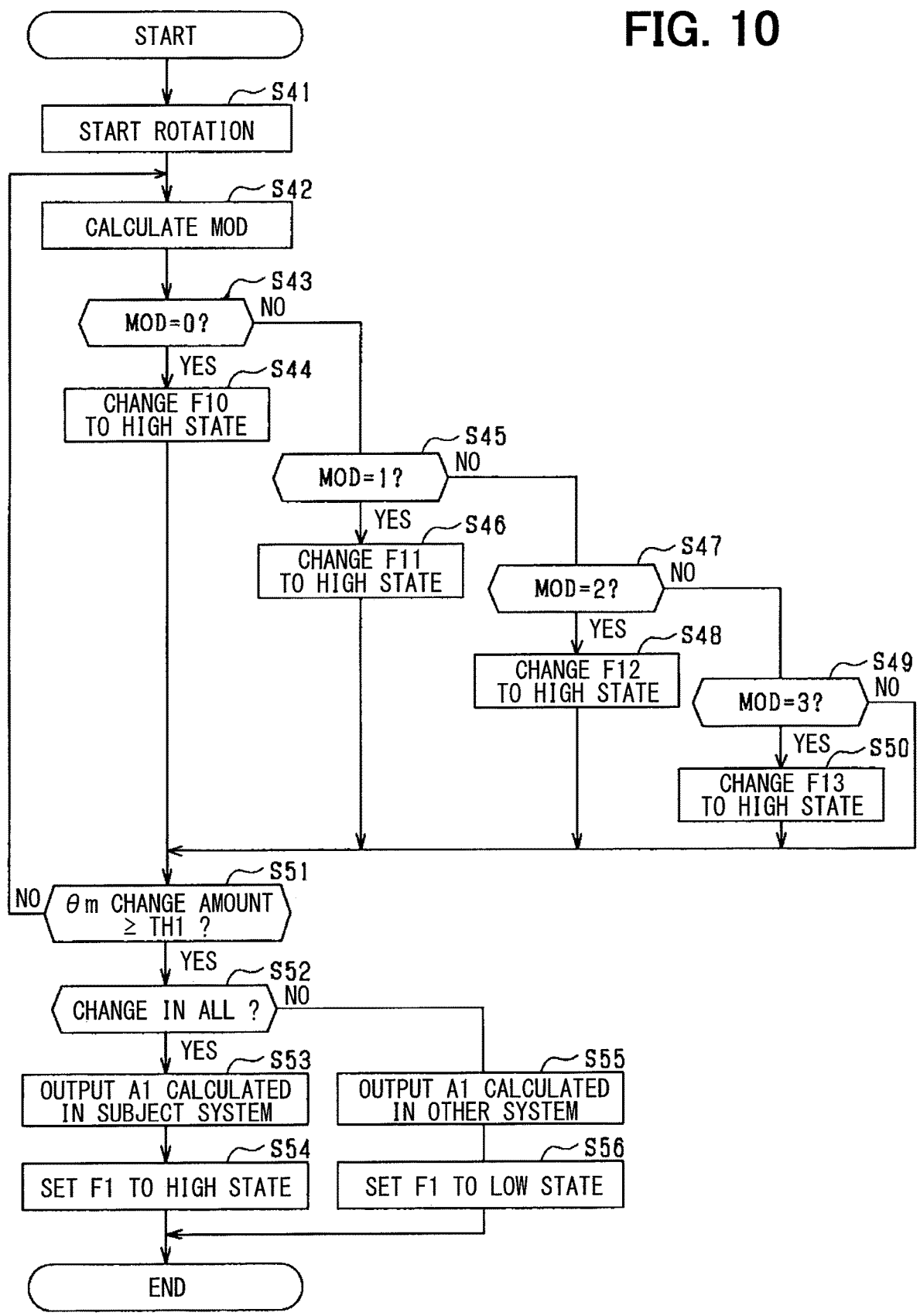
FIG. 10 is a flowchart of the calculation procedure of the reaction force absolute angle according to the third embodiment of the present disclosure.

The calculation procedure of the reaction force absolute angle A1 of the present embodiment is described with reference to FIG. 10. The process shown in FIG. 10 is repeatedly performed by the first control unit 60 in a predetermined cycle. Note that, in the present embodiment, the determination rotation angle Dθ is set to a value of 360° or more.

At step S41, rotation of the reaction force motor 13 is started. At step S42, the normalization value MOD (=MOD (TC, k)) obtained by normalizing the current rotation number TC is calculated.

At steps S43 to S50, it is determined whether or not the normalization value MOD calculated at step S41 has changed to each of all values corresponding to a preset angle range, i.e., a rotation of the reaction force motor 13 by the determination rotation angle DO. More practically, at step S43, it is determined whether the normalization value MOD is "0." When the determination at step S43 is negative and the process proceeds to step S45, it is determined at step S45 whether the normalization value MOD is "1." When the determination at step S45 is negative and the process proceeds to step S47, it is determined at step S47 whether the normalization value MOD is "2." When the determination at step S47 is negative and the process proceeds to step S49, it is determined at step S49 whether the normalization value MOD is "3."

When the determination at step S43 is affirmative, the process proceeds to step S44, and a determination flag F10 indicating that the normalization value MOD has changed to "0" is changed to the high state. When the determination at step S45 is affirmative, the process proceeds to step S46, and a determination flag F11 indicating that the normalization value MOD has changed to "1" is changed to the high state. When the determination at step S47 is affirmative, the process proceeds to step S48, and a determination flag F12 indicating that the normalization value MOD has changed to "2" is changed to the high state. When the determination at step S49 is affirmative, the process proceeds to step S50, and a determination flag F13 indicating that the normalization value MOD has changed to "3" is changed to the high state.

After steps S44, S46, S48, and S50, or when the determination at step S49 is negative, the process proceeds to step S51. At step S51, it is determined whether the amount of change in the rotation angle θm calculated by the angle calculators 53a and 55a is equal to or greater than an angle determination value TH1. The amount of change of the rotation angle θm represents a value obtained by subtracting the initial position P0 at the start of the process of FIG. 10 from the current rotation angle θm. In the present embodiment, since the rotation range is defined as a value of 360° or more, the angle determination value TH1 is a value greater than 360°. Here, assuming that the amount of change in the rotation angle θm does not exceed the angle determination value TH1, the process returns to step S42.

Thereafter, when the amount of change of the rotation angle θm becomes equal to or greater than the angle determination value TH1, the determination at step S51 becomes positive, and the process proceeds to step S52. At step S52, it is determined whether or not the normalization value MOD has changed to each of all the rotation numbers TC corresponding to the determination rotation angle Dθ. In the present embodiment, when all the determination flags F10 to F13 are in the high state, it is determined that the normalization value MOD has changed to each of all the estimatable rotation numbers TC. Note that, when the determination at step S52 is affirmative, the determination flags F10 to F13 may be changed to the low state.

When proceeding to step S53, it is determined that the rotation number TC is normal, and the reaction force absolute angle A1 calculated based on the detection values TC and θm from the first detector 50a is output as an absolute angle to be used for control of the reaction force motor 13. Then, the series of processes shown in FIG. 5 is once ended. On the other hand, when it is determined at step S52 that the normalization value MOD has not changed to each of all the estimatable rotation numbers TC, the process proceeds to step S54, and the reaction force absolute angle A1 calculated by the second control unit 61 (i.e., by a controller in the other system) is output as an absolute angle to be used to control the reaction force motor 13. Then, the series of processes shown in FIG. 5 is once ended.

The following effects may be achievable according to the embodiment described above.

While the first and second control units 60 and 61 rotate the reaction force motor 13 by the determination rotation angle D, if the normalization value MOD does not change to each of all the rotation numbers TC corresponding to the determination rotation angle Dθ, it is determined that the rotation number TC is abnormal. In such case, sticking of the rotation number TC to a certain value as well as dropping of the rotation number TC (i.e., skipping of some of a series of numbers) are determinable as the abnormality of the rotation number TC.

Fourth Embodiment

The fourth embodiment is different from the first embodiment as described above. In the fourth embodiment, the same structural parts are designated with the same reference numbers as the first embodiment for simplification of the description.

In the present embodiment, when the first control unit 60 determines that the rotation number TC calculated by the rotation number calculator 54a of the subject system is abnormal, the rotation number TC calculated by the second control unit 61 in the other system is used for the calculation of the absolute angle A.

Figure 11:
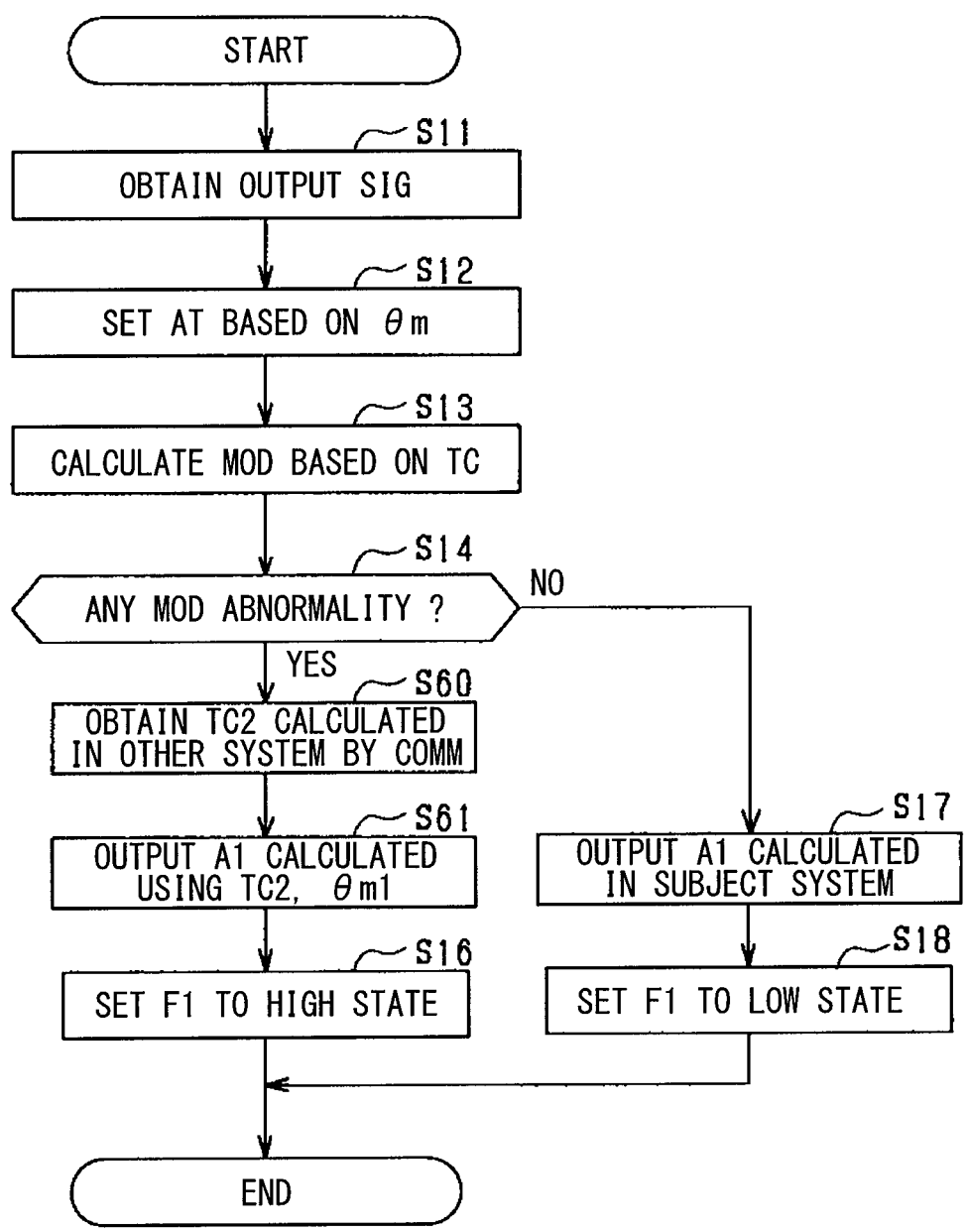
FIG. 11 is a flowchart of the calculation procedure of the reaction force absolute angle according to a fourth embodiment of the present disclosure.

The calculation procedure of the reaction force absolute angle A1 according to the present embodiment is described with reference to FIG. 11. The process shown in FIG. 11 is repeatedly performed by the first control unit 60 in a predetermined cycle.

When it is determined at step S14 that the rotation number TC is abnormal, the process proceeds to step S60. At step S60, the rotation number TC2 detected by the second detector 50b of the other system is obtained by communication from the second control unit 61.

At step S61, the reaction force absolute angle A1 is calculated by using the rotation number TC2 obtained at step S60 and the rotation angle θm1 detected by the first detector 50a. Then, the series of processes shown in FIG. 5 is once ended.

In the present embodiment described above, the same effects as in the first embodiment is obtainable.

Other Embodiments

The steering system 100 may be an electric power steering system of an electric assist type, as well as the steering system of the steer-by-wire type. In such case, a motor in such a system which serves as a detection target may be configured as shown in FIGS. 12 and 13.

Figure 12:
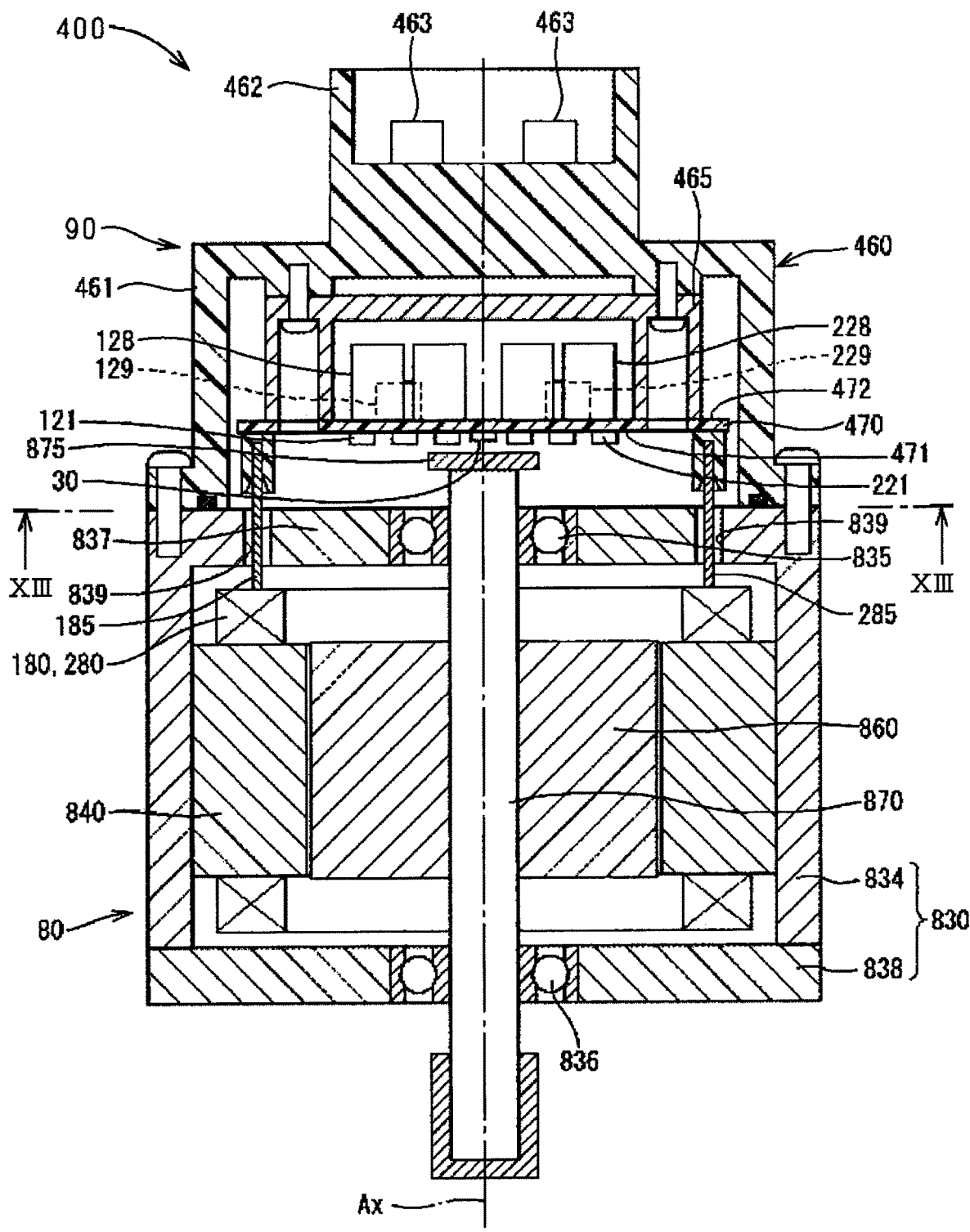
FIG. 12 is a diagram of a configuration of a motor as a modification example.
Figure 13:
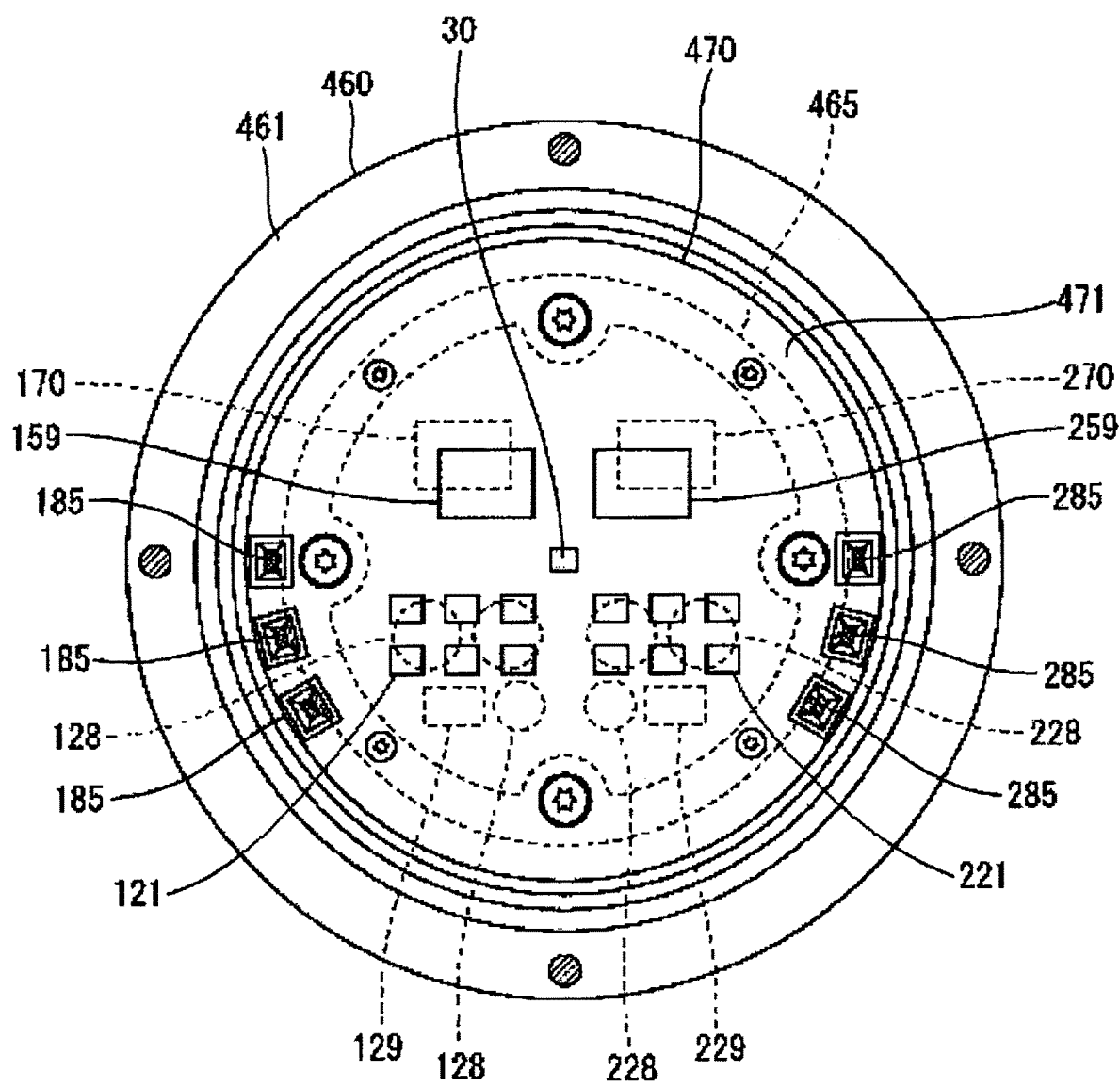
FIG. 13 is a diagram of another configuration of the motor as a modification example.

As shown in FIGS. 12 and 13, a motor 80 outputs a part or all of the torque required for steering, and is driven by the electric power supplied from the battery 200 to drive the speed reduction gear in forward and reverse rotations. The motor 80 is a three-phase brushless motor, and has a rotor 860 and a stator 840.

The motor 80 has a first motor winding 180 and a second motor winding 280 respectively as two sets of winding. The motor windings 180 and 280 have the same electrical characteristics, and are wound around the stator 840 with their electrical angles shifted from each other by 30 degrees. Correspondingly, phase currents are controlled to be supplied to the motor windings 180 and 280 with a phase difference φ of 30 degrees. By optimizing a current supply phase difference, the output torque is improved. Further, a sixth-order torque ripple is reduced. Furthermore, merits of cancellation of noise and vibration are maximized by an optimization of the current supply phase difference, due to the averaged electric current. Also, heat generation is averaged among the different systems, thereby enabling the reduction of a temperature-dependent inter-system error, which is typically observed in the detection values of various sensors or detected torques, as well as enabling supply amounts of the electric currents averaged among the different systems.

Hereinafter, a combination of a first driver circuit 120, a first sensor unit 130, a first control unit 170 and the like is designated as a first system L1, which is related to a drive control of the first motor winding 180, and a combination of a second driver circuit 220, a second sensor unit 230, a second control unit 270 and the like is designated as a second system L2, which is related to a drive control of the second motor winding 280. The configuration related to the first system L1 is basically indicated with reference numbers of 100, and the configuration related to the second system L2 is basically indicated with reference numbers of 200. In the first system L1 and the second system L2, the same or similar configuration is indicated with same reference numbers in the least significant two digits. For the other configuration described below, the term "first" is typically indicated with a suffix "1," and the term "second" is typically indicated with a suffix "2."

In a drive device 400, an ECU 90 is integrally provided on one end in an axial direction of the motor 80, which may be known as a mechanism-controller integrated type. However, the motor 80 and the ECU 90 may be separately disposed. The ECU 90 is positioned coaxially with an axis Ax of a shaft 870 on one end opposite to an output shaft of the motor 80. The ECU 90 may alternatively be provided on an output shaft side of the motor 80. By adopting the mechanism-controller integrated type drive device 400, it may be possible to efficiently put the ECU 90 and the motor 80 in a space-restricted installation position in a vehicle.

The motor 80 includes, in addition to the stator 840 and rotor 860, a housing 830 that houses the stator 840 and the rotor 860, and the like. The stator 840 is fixed to the housing 830 and the motor windings 180 and 280 are wound thereon. The rotor 860 is placed radially inside the stator 840 to be rotatable relative to the stator 840.

The shaft 870 is fitted into the rotor 860 to rotate integrally with the rotor 860. The shaft 870 is rotatably supported by the housing 830 by using bearings 835 and 836. An end portion of the shaft 870 on an ECU 90 side protrudes from the housing 830 toward the ECU 90. A magnet 875 is provided at the axial end of the shaft 870 on the ECU 10 side.

The housing 830 has a bottomed cylindrical case 834 including a rear frame end 837, and has a front frame end 838 placed on an opening of the case 834. The case 834 and the front frame end 838 are fastened to each other by bolts or the like. Lead wire insertion holes 839 are formed in the rear frame end 837. Lead wires 185 and 285 are inserted into the lead wire insertion holes 839 for a connection to each phase of the motor windings 180 and 280. The lead wires 185 and 285 are taken out from the lead wire insertion holes 839 toward the ECU 90 and are connected to a circuit board 470.

The ECU 90 includes a cover 460 and a heat sink 465 fixed to the cover 460 in addition to the circuit board 470 fixed to the heat sink 465. The ECU 90 further includes various electronic components and the like mounted on the circuit board 470.

The cover 460 protects the electronic components from external impacts and prevents dust, water or the like from entering into the ECU 90. The cover 460 is provided as a one-body integrated combination of a cover body 461 and a connector member 462. The connector member 462 may alternatively be separated from the cover body 461. Terminals 463 of the connector member 462 are connected to the circuit board 470 via a wiring (not shown) or the like. The number of connectors and the number of terminals may be arbitrarily changed in correspondence to the number of signals and the like. The connector member 462 is provided at an axial end portion of the drive device 400, and has an opening opened toward a direction opposite to the motor 80.

The circuit board 470 is, for example, a printed circuit board, and is positioned to face the rear frame end 837. On the circuit board 470, the electronic components of the first and second systems are mounted independently for each system so that the two systems are configured to make a fully-redundant system. According to the present embodiment, the electronic components are mounted on the circuit board 47 in one piece. The electronic components may alternatively be mounted on plural circuit boards.

Of two principal surfaces of the circuit board 470, one surface facing the motor 80 is referred to as a motor-side surface 471 and the other surface facing away from the motor 80 is referred to as a cover-side surface 472. As shown in FIG. 13, switching elements 121 forming the driver circuit 120, switching elements 221 forming the driver circuit 220, a rotation angle sensor 30 as a detector, custom ICs 159, 259 and the like are mounted on the motor-side surface 471. The rotation angle sensor 30 is mounted at a position facing the magnet 875 so as to be able to detect a change in the magnetic field caused by rotation of the magnet 875.

On the cover-side surface 472, capacitors 128, 228, inductors 129, 229, and microcomputers forming the control units 170, 270 are mounted. In FIG. 13, reference numerals 170 and 270 are assigned to the microcomputers provided as the control units 170 and 270, respectively. The capacitors 128 and 228 smooth the electric power input from batteries 200.

Further, the capacitors 128 and 228 assist electric power supply to the motor 80 by storing electric charge therein. The capacitors 128 and 228 and the inductors 129 and 229 form a filter circuit to reduce noise transmitted from other devices sharing the batteries 200, and also reduce noise transmitted from the drive device 400 to the other devices sharing the batteries 200. It is noted that, power supply relays, motor relays, current sensors, etc. (not shown in the drawings) are also mounted on the motor-side surface 471 or on the cover-side surface 472.

The steering shaft 12 may be provided as a detection target. In such case, the steering system 100 may be provided with a plurality of rotation angle detectors for detecting the rotation angle θm and the rotation number TC of the steering shaft 12, instead of the rotation angle θm and the rotation number TC of the motors 13 and 22.

The reaction force detector 41 and the turning detector 46 may be provided with three or more detectors instead of having the two detectors. In such case, the presence or absence of abnormality in the rotation number TC may be determined by using the rotation angle θm detected and the rotation number TC by each of the detectors.

Each of the detection units 50a to 50d may be configured to include one of the angle calculators 53a to 55d and one of the rotation number calculators 54a to 54d.

The first and second control units 60 and 61 may determine the presence or absence of an abnormality in the detection values θm and TC by using an error detection signal included in the detection signal. In such case, when it is determined at steps S12 to S14 that the detection value θm or TC is abnormal by using the error detection signal, an affirmative determination may be made at step S14, and the process may proceed to step S15.

The rotation information may be any information other than the absolute angle as long as the information is calculable by using the rotation angle θm and the rotation number TC of the detection target. For example, as the rotation information, the neutral position may be directly calculated.

What is claimed is:
1. A rotation detector, comprising:
   a first detector including:
      (i) rotation number calculator configured to calculate a rotation number based on an output value from a main sensor element that detects a rotation of a detection target, wherein a preset rotation angle is less than 360 degrees, wherein one full rotation of 360 degrees is divided by the preset rotation angle to yield an integer number of segments, wherein the rotation number indicates how many segments have been detected during the rotation of the detection target; and (ii) an angle calculator configured to calculate a rotation angle of the detection target based on the output value from the main sensor element, wherein the rotation angle is less than 360 degrees; and a first controller configured to:

(i) calculate an estimated number based on the rotation angle;

(ii) calculate a normalization value equal to a modulus of the rotation number based on the integer number; and (iii) determine that a modulus abnormality occurred when the estimated number does not equal the normalization value.

2. The rotation detector of claim 1, wherein the first detector and the first controller comprise a subject system, a second detector and a second controller comprise an other system, the first controller and the second controller are configured to communicate with each other, and the first controller in the subject system calculates rotation information by using (i) a rotation number calculated by the second detector in the other system and (ii) the rotation angle calculated by the first detector in the subject system when the first controller determines that abnormality is caused in the rotation number of the subject system.

3. The rotation detector of claim 1, wherein the first controller calculates the estimated number as an estimation of the rotation number of the detection target, based on the rotation angle calculated by the angle calculator, and the first controller determines that the rotation number is abnormal when the rotation number calculated by the rotation number calculator and the estimated number are different from each other.

4. The rotation detector of claim 1, wherein the first controller calculates the estimated number as an estimation of the rotation angle of the detection target, based on the rotation number calculated by the rotation number calculator, and the first controller determines that the rotation number is abnormal when a degree of difference between (i) the rotation angle calculated by the angle calculator and (ii) the estimated number is greater than a preset value.

5. The rotation detector of claim 1, wherein the first controller determines that the rotation number is abnormal when the rotation number calculated by the rotation number calculator during a rotation of the detection target by an amount of a preset determination angle indicating a preset rotation angle does not change to each of all values respectively corresponding to the rotation of the detection target by the amount of the preset determination angle.

6. A steering system, comprising:

a rotation detector including:

a first detector including:

(i) rotation number calculator configured to calculate a rotation number based on an output value from a main sensor element that detects a rotation of a detection target, wherein a preset rotation angle is less than 360 degrees, wherein one full rotation of 360 degrees is divided by the preset rotation angle to yield an integer number of segments, wherein the rotation number indicates how many segments have been detected during the rotation of the detection target; and (ii) an angle calculator configured to calculate a rotation angle of the detection target based on the output value from the main sensor element, wherein the rotation angle is less than 360 degrees; and a first controller configured to:

(i) calculate an estimated number based on the rotation angle;

(ii) calculate a normalization value equal to a modulus of the rotation number based on the integer number; and (iii) determine that a modulus abnormality occurred when the estimated number does not equal the normalization value, wherein a steering device is provided for receiving a steering operation of a driver of a vehicle;

a tire turning device is provided for turning a direction of a tire of the vehicle, wherein the steering device has, as a detection target, a reaction force motor for applying a reaction force to a steering wheel according to the steering operation of the driver, the tire turning device has, as a detection target, a turning motor for providing a tire turning force to the tire turning device, and the rotation detector is implemented as (i) a turning detector for detecting the rotation number of the turning motor and (ii) a reaction force detector for detecting the rotation number of the reaction force motor.

7. The steering system of claim 6, wherein rotation information is an absolute angle indicative of a rotation amount of the steering wheel calculated based on the rotation number of the reaction force detector, and a reaction force controller is provided (i) for a calculation of a neutral position indicative of a rotation angle of the steering wheel for a straight travel of the vehicle based on the absolute angle, and (ii) for a drive control of the reaction force motor based on the calculated neutral position.

8. The steering system of claim 7, wherein the reaction force controller calculates the neutral position for the drive control of the reaction force motor based on the absolute angle calculated by the first controller when the first controller of the reaction force detector determines abnormality of the rotation number.

9. The steering system of claim 7, wherein the reaction force controller sets an input value from the driver to the neutral position when the first controller of the reaction force detector determines abnormality of the rotation number.

10. The steering system of claim 6, wherein
rotation information is an absolute angle indicative of an amount of rotation of the steering wheel calculated based on the rotation number of the turning detector, and
a turning controller is provided (i) for calculation of a neutral position indicative of a rotation angle of the steering wheel for a straight travel of the vehicle and (ii) for a drive control of the turning motor based on the calculated neutral position.

11. The steering system of claim 10, wherein
the turning controller controls the turning motor to change a direction of the tire to a preset straight-travel direction of the vehicle according to an input from the driver when the first controller of the turning detector determines abnormality of the rotation number.

12. The steering system of claim 6, further comprising:
a warning provider for providing warning to the driver when the first controller of the turning detector determines abnormality of the rotation number.

13. The rotation detector of claim 2, wherein
the first controller in the subject system calculates rotation information by using (i) the rotation number calculated by the second detector in the other system and (ii) the rotation angle calculated by the first detector in the subject system when the first controller determines that abnormality is caused in the rotation number of the subject system by utilizing a normalization value of the rotation number.

\* \* \* \* \*